US008335717B2

(12) United States Patent
Deng et al.

(10) Patent No.: US 8,335,717 B2
(45) Date of Patent: Dec. 18, 2012

(54) PROFIT OPPORTUNITIES ACROSS SPONSORED KEYWORD AUCTION MARKETS

(75) Inventors: Xiaotie Deng, Kowloon (HK); Tian-Ming Bu, Shanghai (CN); Qi Qi, Shanghai (CN)

(73) Assignee: City University of Hong Kong, Kowloon (HK)

( * ) Notice: Subject to any disclaimer, the term of this patent is extended or adjusted under 35 U.S.C. 154(b) by 707 days.

(21) Appl. No.: 12/425,368

(22) Filed: Apr. 16, 2009

(65) Prior Publication Data

US 2009/0276310 A1    Nov. 5, 2009

Related U.S. Application Data

(60) Provisional application No. 61/046,284, filed on Apr. 18, 2008.

(51) Int. Cl.
*G06Q 30/00* (2006.01)
(52) U.S. Cl. .................................. 705/14.46; 705/14.54
(58) Field of Classification Search ...................... 705/14
See application file for complete search history.

(56) References Cited

U.S. PATENT DOCUMENTS

| | | | |
|---|---|---|---|
| 2009/0055268 A1* | 2/2009 | Knoller et al. | 705/14 |
| 2009/0138445 A1* | 5/2009 | White et al. | 707/3 |
| 2010/0306210 A1* | 12/2010 | Wang et al. | 707/759 |

OTHER PUBLICATIONS

Aggarwal, et al., "Truthful auctions for pricing search keywords." In J. Feigenbaum, J. C-I. Chuang, and D.M. Pennock, editors, Proceedings of 7th ACM Conference on Electronic Commerce (EC-06), pp. 1-7, Ann Arbor, Michigan, USA, Nov. 15, 2006. ACM, 14 pages.
Bu, et al., "Dynamics of strategic manipulation in ad-words auction." In Third Workshop on Sponsored Search Auctions, in conjunction with WWW2007, Banff, Canada, May 8-12, 2007, 10 pages.
Bu, et al., "Forward looking nash equilibrium for keyword auction." Information Processing Letters, 105(2): 41-46, Jan. 16, 2008.
Carry, et al., "Greedy bidding strategies for keyword auctions." In J. K. MacKie-Mason, D.C. Parkes, and P. Resnick, editors, Proceedings of 8th ACM Conference on Electronic Commerce (EC-2007), pp. 262-271, San Diego, California, USA, Jun. 11-15, 2007. ACM, 10 pages.
Clarke, "Multipart pricing of public goods." Public Choice, 11:11-33, 1971, 17 pages.
Cox, et al., "Theory and behavior of single object auctions." Research in Experimental Economics, 1982, 43 pages.

(Continued)

*Primary Examiner* — Alvin L Brown
(74) *Attorney, Agent, or Firm* — Turocy & Watson, LLP

(57) ABSTRACT

Methods for gaining profit of a sponsored keyword auctioneer are described herein. The method begins with holding a local keyword auction, and receiving bids for it, wherein each bid is for the right to display one advertisement associated with the bid in response to the bid being allocated along with one keyword. Bid for the same keyword at other auctions are placed. Once the bidders of the local keyword auction to adjust bids, the bid at the external auction is changed by utilizing a forward looking Nash equilibrium response function.

16 Claims, 7 Drawing Sheets

OTHER PUBLICATIONS

Edelman, et al., Internet advertising and the generalized second price auction: Selling billions of dollars worth of keywords.: American Economic Review, 97(1): 242-259, Mar. 2007, 18 pages.

Groves, et al., "Incentives in teams." Econometrica, 41:617-631, 1973.

Liang, et al., "Cooperative or vindictive: Bidding strategies in sponsored search auction." In the 3rd International Workshop on Internet and Netword Economics (WINE 2007), San Diego, CA, USA, Dec. 14, 2007, 12 pages.

Mahdian, et al., "Allocating online advertisement space with unreliable estimates." In ACM Conference on Electronic Commerce (EC-07), pp. 288-294, 2007, 8 pages.

Myerson, et al., "Incentive-compatibility and the bargaining problem." Econometrica, 47:61-73, 1979.

Varian, et al., "Position Auctions." To appear in International Journal of Industrial Organization, 20 pages.

Vickrey, et al., "Counterspeculation, auctions, and competitive sealed tenders." Journal of Finances, XVI:8-37, 1961, 31 pages.

Vorobeychik, et al., "Equilibrium analysis of dynamic bidding in sponsored search auctions." In the 3rd International Workshop on Internet and Network Economics (WINE 2007), San Diego, CA, USA, Dec. 12-14, 2007. 23 pages.

* cited by examiner

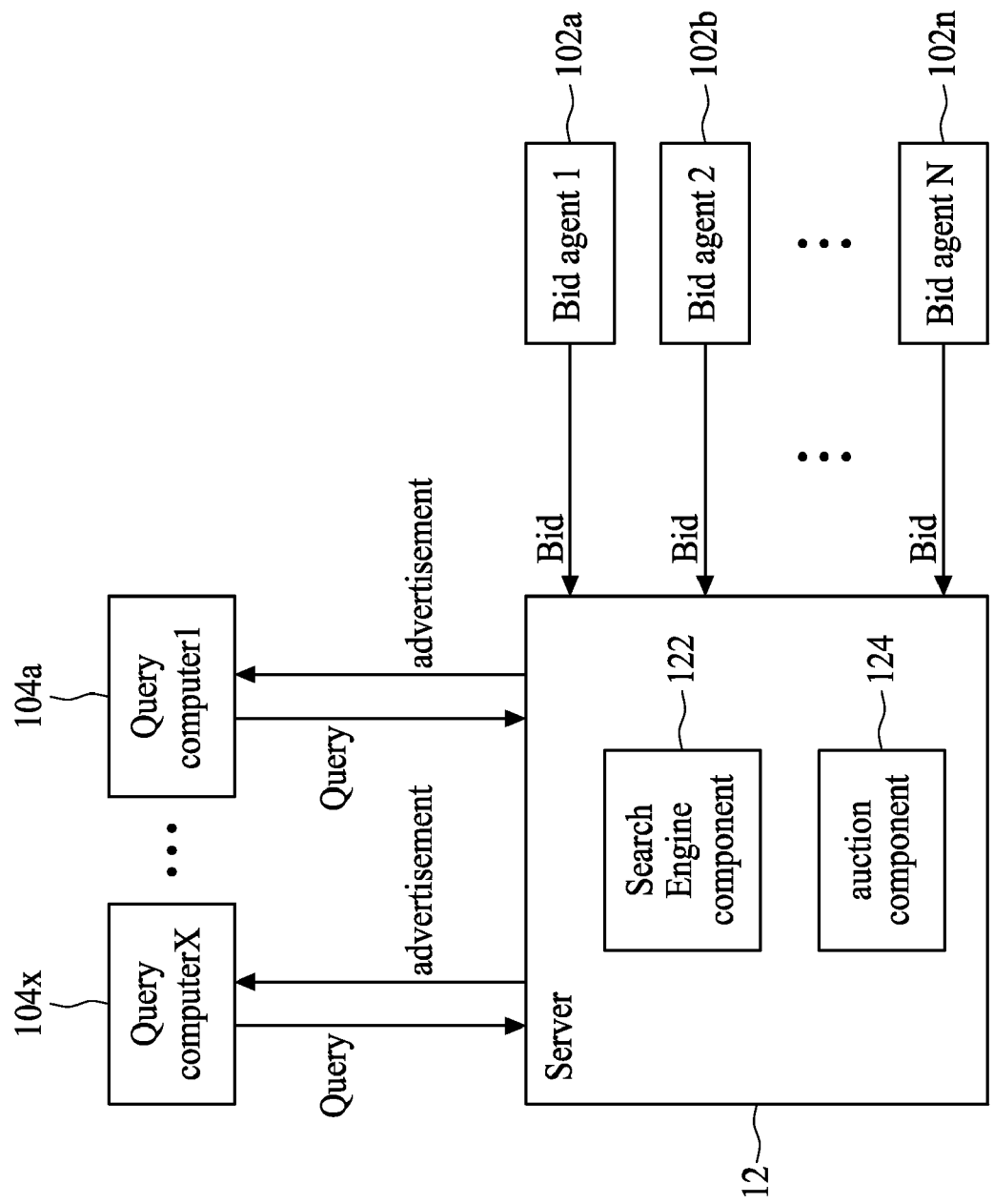

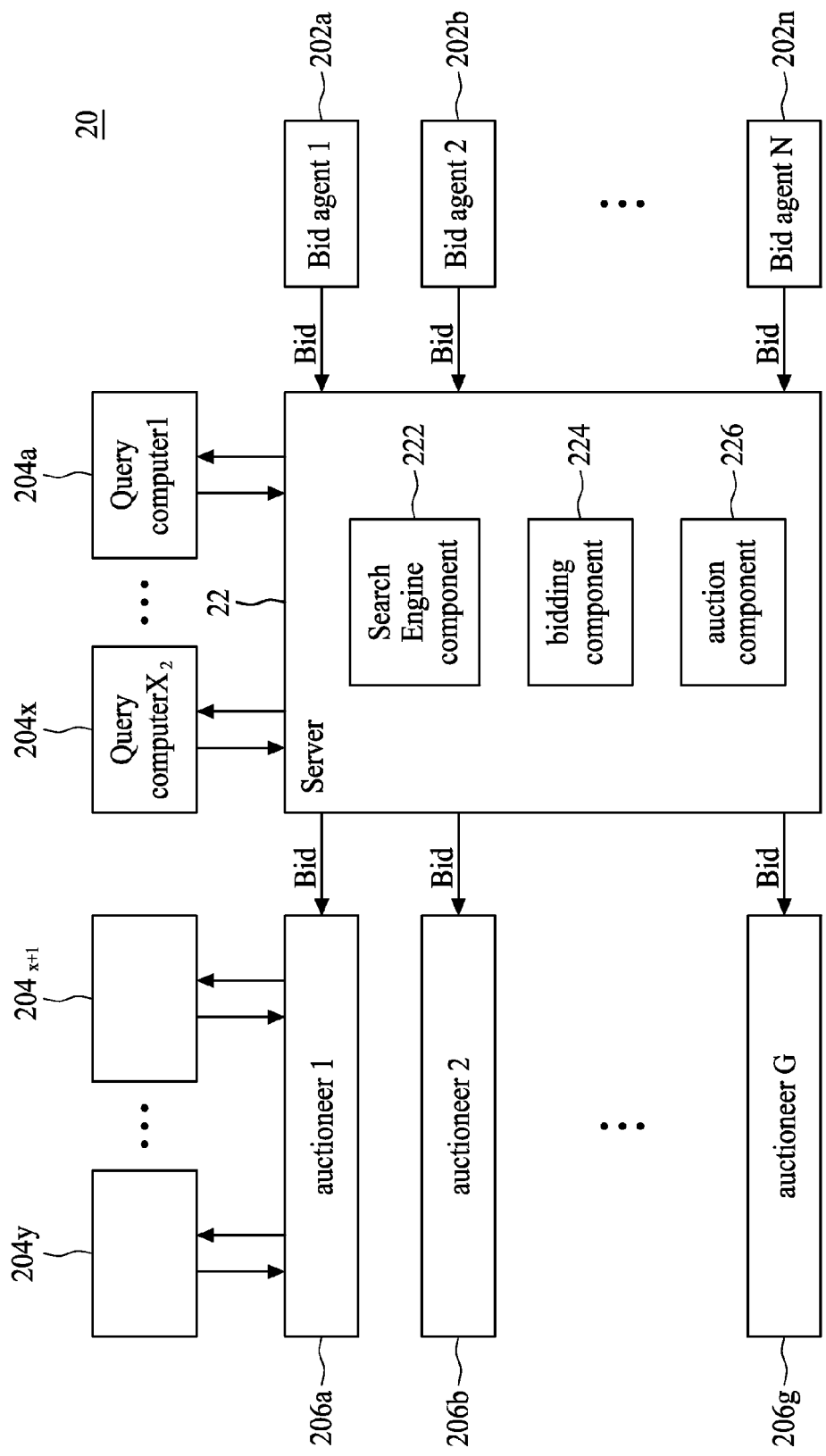

Google | rose mask | [Search]

Advanced Search
Preferences

Web     Result 1-10 of about 1,650,000 for rose mask. (0.10 seconds)

Fresh Rose Mask - Face & Skin Care - Compare Prices, Reviews and ...
Fresh Rose Mask - 4 results like the Fresh Rose Face Mask 3.5 oz, Fresh rose face mask,
3.5 oz, Fresh Rose Face Mask 3.4 oz,Fresh Rose Face Mask 100ml ...
www.nextag.com/fresh-rose-mask/search-html - 65k - Cached - Similar pages - Note this Energizing Rose Mask - At-Home Facial Treatment Masks - iVillage ...
With just a cup of plan yogurt and a few choice ingredients you van change the look and feel
of your skin.
beauty.ivillage.com/skinbody/facecare/0.96sswrnc.00.html - 46k -
Cached - Similar pages - Note this Indian Rose Mask - Craftbits.com Craft Project
Indian Rose Mask craft project; Free Craft Projects, Ideas, Crafts. Kids lesson plans,
Wedding crafts, Candle and Soap Making, Scrapbook, Crochet, ...
www.Craftbits.com/viewProject.do?ProjectID=764 - 70k - Cached - Similar pages - Note this Sephora: Korres Wild Rose Mask: Masks
What is: An instant brightening and illuminating vitamin C mask. What it is formulated to do:
Suitable for all skin types, an instant brightening effect ....
www.sephora.com/browse/product;jhtmlijsessionid=C1YLDGLBIXQOFLAUCLBBXCQ?
id=P155112&categoryId=C11245 - 61k - Cached - Similar pages - Note this BEAUTY STYLE Collagen modeling and lifting mask with rose extract ...
BEAUTY STYLE Collagen modeling and lifting mask with rose extract.
www.bsmask.com/prod/221/16/details.html - 11k - Cached - Similar pages - Note this Sponsored Links Costume Rose
Costume Rose
Shop Target.com
www.Target.com Rose Mask
Refresh Your Skin.
Save on Rose Mask
BizRate.com/masks Mask Rose
Huge selection of
Mask Rose items.
Yahoo.com Rose Mask
Renew Your Skin With Our Huge
Selection Of Rose Mask!
www.becom.com Rose Mask For Less
Looking for Rose Mask?
Buy direct from sellers and save.
www.eBay.com

Fig. 3

Yahoo! My Yahoo! Mail Welcome, Guest|Sign Out| Help

YAHOO!

Web | Images | Video | Local | Shopping | more ▼

| rose mask | Search | Option ▼ Customize ▼

1 - 10 of 32,900,000 for rose mask (About) - 0.26 s | SearchScanBETA On
SPONSOR

Search In: ⦿ the Web  ◯ pages from Taiwan
Also try: fresh rose mask, rose mask lovebirds, More...

Sephora: Fresh Rose Face Mask: Masks
<b>What it is:</b><br><br>A hydrating and toning gel mask that contains real rose petals.<br><br><b>What it is formulated to do:</b><br>Rose Face Mask is a hydrating ...
sephora.com/browse/product.jhtml?id=P12336&categoryId=S15145&... - 70k - Cached Fresh Rose Face Mask - Personal Care - Sephora
Shop for Fresh Rose Face Mask in the personal care department of Sephora. For a limited time, free shipping over $35 code: SHIP35
www.sephora.com/browse/product.jhtml?id=P12336

Buy Fresh Rose Face Mask Online at Beauty.com
Shop online for Fresh Rose Face Mask at Beauty.com today, where you will find a huge selection of Masks products, in addition to lots of Fresh products.
www.drugstore.com/qxp72799_332828_sespider-65k - Cached Web Graphics on a Budget - 5.0 Masks
To make the mask: Open the rose graphic and Duplicate your graphic (Shift D) ... Now it's time to use your mask: Make another copy of your rose graphic. ...
mardiweb.com/web/masks5/masks501_1.htm - Cached Besame Delightful Rose Mask... Info @ Beauty Products Compared
Thorough review of Besame Delightful Rose Mask wrinkle cream. Besame Delightful Rose Mask described and evaluated ~ with ingredient information ~ pros & cons and more.
www.beautyproductscompared.com/besame-delightful-rose-mask-review Rose Skin Care Mask
Save on Rose Skin Care Mask. Find Nextag Sellers' Lowest Price.
www.NextTag.com Fresh Rose Face Mask
Rose Face Mask
Thousands of Discount Name Brands Skincare & Makeup! Free Shipping.
I-resh.CosmeticAmerica.com See your message here...

PROFIT OPPORTUNITIES ACROSS SPONSORED KEYWORD AUCTION MARKETS

CROSS-REFERENCE TO THE RELATED APPLICATIONS

This application is based upon and claims the benefit of priority from the prior U.S. provisional application 61/046,284, filed Apr. 18, 2008, the entire contents of which are incorporated herein by reference.

TECHNICAL FIELD

This disclosure relates generally to advertising, and in particular, but not exclusively, relates to utilizing a forward looking Nash equilibrium in an sponsored keyword auction.

BACKGROUND

The on-line advertising market has become a principal source of revenue for search engine companies. The business model relies on advertisement sales that provide advertisers with opportunities to introduce their products directly to potential customers. The business model, known as sponsored keyword auction, identifies each user of a search engine, who submits a keyword or several keywords to the search engine, as a potential customer to related consumer products. Web links displaying those products are listed along with the search results of the queried keywords. To win the slots for displaying positions of web links, advertisers compete through an auction process.

Some advertising positions draw more attentions from users and generate more clicks than others. Therefore, different advertising positions have different click-through-rates, the ratio of the number of clicks on the advertising to the number of appearances of the advertising web links. For this reason, it is named the position auction or Generalized Second Price (GSP) auction.

Conventional researches model the position auction together with the bidding strategies of advertisers (or agents) as a pure Nash equilibrium, in which an agent will choose a strategy that maximizes the agent's own utility with respect to a given set of strategies of other players. However, in a pure Nash equilibrium, optimal agent utility is not maximized since bidders of a pure Nash equilibrium do not consider the influence their bids have on future decisions of other bidders—the pure Nash equilibrium does not consider the indirect influence bids have on others' future bidding decisions.

It is therefore desirable to have systems and methods for improving social efficiency, and improving the revenues of all the auctioneers and bidder.

SUMMARY

In one aspect of the invention, methods for gaining profit opportunities of auctioneer are described herein. In some embodiments, the method begins with holding a local keyword auction, and receiving bids for it, wherein each bid is for the right to display one advertisement associated with the bid in response to the bid being allocated along with one keyword. Bid for the same keyword at other auctions are placed. Once the bidders of the local keyword auction adjust bids, the bid at the external auction is changed by utilizing a forward looking Nash equilibrium response function.

In some embodiments of the invention, the method begins with receiving a plurality of bids of the local keyword auction, wherein each bid is for the right to display one advertisement associated with the bid in response to the bid being allocated at least one keyword. Bid for the same keyword are placed at external auctions, wherein none bidders of the local keyword auction bids at the external auction, and the bid is set according to a forward looking Nash equilibrium response function. Once the bidders of the local keyword auction adjust bids, the bid at the external auction is changed by utilizing a forward looking Nash equilibrium response function. If an advertisement viewer clicks the advertising slot shown on the external auction, the advertisement viewer is re-directed to a first web site then to the client's advertising web page, wherein a client is a local keyword auction winner. The client is charged by the number of times a viewer links from the first web site to the client's advertising web page.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 1 shows a sponsored keyword auction model.

FIG. 2 shows a cross-market sponsored keyword auction model in accordance with the present invention.

FIGS. 3 and 4 show an exemplary result that auctioneer Yahoo! bid "rose mask" at Google's auction.

DETAILED DESCRIPTION

Figure 5:
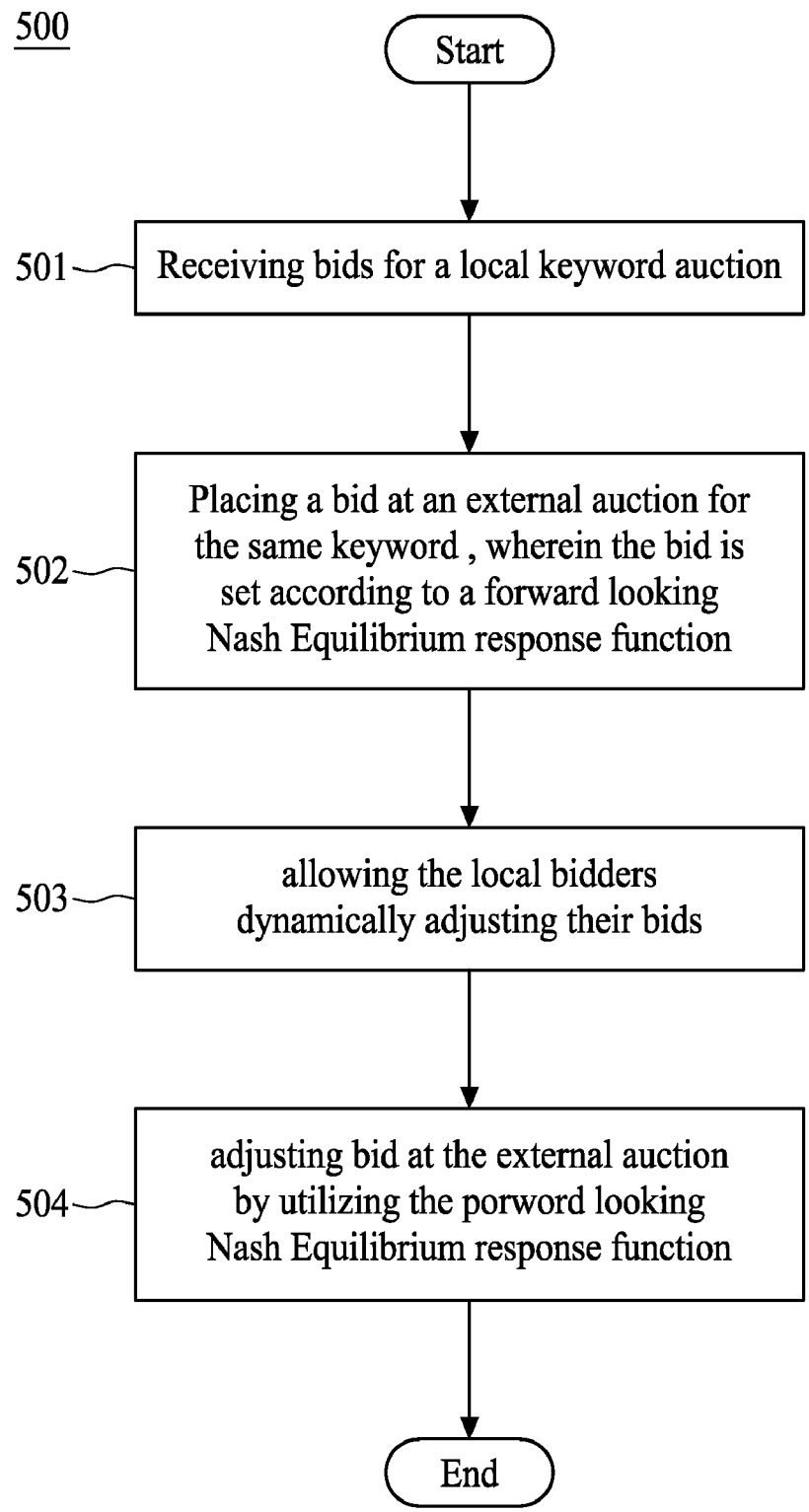
FIG. 5 shows a flow chart operated by the server in the cross market auction model in accordance with some embodiments of the invention.

Embodiments of systems and methods for facilitating more efficient bidding in cross markets sponsored keyword auction are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 shows a sponsored keyword auction model 10. One or more bid agents 102a-102n and one or more query computers 104a-104x are connected to a server 12. The bid agents 102 bid for advertisement slots displayed on the Web display space, usually a search engine owned by the server 12. The slots usually are advertisements related to a keyword that was send out by the query computers 104. Once the query computer 104 requests search result of a keyword, the search engine 122 not only shows the search result regarding the keywords, but also the slots for tempting the query computers 104 to click through. The prices that bid agents 102 have to pay are based on the clicks into their advertisement web pages from the search engine's display of the keyword. The charging scheme is commonly referred to as "pay-per-click".

More specifically, the auction component 124 of the server 12 allocates K positions to the K highest price bid agents. Each position is associated with a click-through-rate (CTR) a viewer may click into the advertisement link placed at that position. Advertisement slots allocated at higher ranked position are supposedly having higher CTRs and thus more revenues. The auction component 124 sorts the N bids in a linear increasing order. More higher a bid agent bids, the possibility that it wins a hot slot goes higher. The auction component 124 charges a click on a higher ranking advertisement slot a price equal to the bidding price of the advertiser placed at the next lower ranked position. Thus, for each bid agent, an advertisement slot costs more if it got more clicks. The N-K losers will not have to pay since the search engine 122 will not publish losers' advertisements.

Bid agents have an estimation of the potential value to their products of the users who are interested in the keyword. The estimation is in general different for different bid agents. The difference may result from various reasons, such as the differences in their products, or differences in their marketing strategies. The value is private to the advertisers. They may or may not want to reveal their private values of the click on the keyword. The utility of a position-i winner, noted as $u_i = c_i \times (v_i - b_{i+1})$, is dependent on its private value $v_i$ the click-through-rate $c_i$ of position i, and the bid of the winner for position i+1. The bidding process allows bid agents amending their bids. In this dynamic process, the bid agent can reasonably design its own bidding strategies to improve its utilities. It has proved, by common inventors of this application, that the sponsored keyword auction eventually converges to forward looking Nash equilibrium.

One of the beauties in the sponsored keyword auction markets is that for a same keyword, different auctions have different prices. Some of the present embodiments take advantages of this property and provide profitable schemes when placing bids and holding auctions across markets.

FIG. 2 shows a cross-market sponsored keyword auction model 20 in accordance with the present invention. In cross-market sponsored keyword auction, the server 22 is an auctioneer as well as a bidder for bidding the same keyword advertisements in external auctions 206a-206g. Since the server 22 can charge the bid-winners 202a-202k each time a query computer 204 has click through the bided advertisement, the more traffic flow into search engine 222 would be more benefit for the server 22. FIG. 3 shows an exemplary result when Yahoo! bid "rose mask" in Google. In this example, Yahoo! holds an auction for "rose mask"; then Yahoo! bid one slot at Google to increase the exposure of Yahoo!'s bid-winner. If a query component 204y views results searched by Google and clicks the slot of Yahoo!'s advertisement, the query component 204y will be direct to yahoo's search result page, shown as FIG. 4.

To have an overview of what server 22 has done in the cross-market sponsored keyword auction model, FIG. 5 shows a flow chart operated by the server in the cross market auction model in accordance with some embodiments of the invention. The method 500 begins with receiving bids for a local keyword auction in step 501, wherein each bid is for the right to display one advertisement associated with the bid in response to the bid being allocated at least one keyword. In step 502, the server places a bid at an external auction for the same keyword, wherein the bid is set according to a forward looking Nash equilibrium response function. In step 503, the server allows local bidders dynamically adjusting their bids. In the step 504, the server adjusts the bid at the external auction by utilizing the forward looking Nash equilibrium response function.

It is proved that Forward looking Nash equilibrium has a better description of position auction than Nash equilibrium does. The forward looking Nash equilibrium take into consideration the effect of the existing strategies of other agents, as well as their further response to its own benefit.

Referring to FIG. 2 again, sever 22 comprises a search engine component 222, bidding component 224 and auction component 226. The server 22 and components 222-226 explained below may constitute machine-executable instructions embodied within a machine (e.g., computer) readable medium, which when executed by a machine will cause the machine to perform the operations described. Additionally, the server 22 and components 222-226 may be embodied within hardware, such as an application specific integrated circuit (ASIC) or the like. The order in which some or all of the process blocks appear in each process should not be deemed limiting. Rather, it should be understood by a person of ordinary skill in the art having the benefit of the instant disclosure that some of the process blocks may be executed in a variety of orders not illustrated.

Server 22 illustrated by FIG. 2 can include an auction component 226 that can hold local keyword auctions, and receiving bids from bidding agents. The auction component 226 also enable bidding agents dynamically adjusting their bids for maximizing bidding agents' own profit The search engine component 222 not only shows search results regarding a query, but also shows the advertisement that win the sponsored keyword auction of the query. Bidding component 224 is configured to place bids at external auctions of the same query. For example, if the auction component 226 holds a sponsored keyword auction of the keyword "gardening", the bidding component 224 placing bid at externals auctions of "gardening". If users $204_{x+1}$ of other search engine click through the advertising slot that won by the server 22, the user is directed to the server's web page. The server 22 charges the advertisement slot owner by the number of times that the advertising slot is clicked. In some embodiments of the invention, the bidding component 224 does not attend the local auction held by the server 22 itself.

In an embodiment disclosed by FIG. 2, auction component 226 enables bidding agent of local auction to dynamically adjust their bids. The auction component 226 further allows the bidding agents placing a future bids different from the present bids. In some embodiments, the auction component 226 allows the bidding agent of local auction utilizing forward looking Nash equilibrium response function for adjusting the local bids. In yet some embodiments, auction component 226 can enable bidding agent to induce at least one other bidding agent to abandon a present bid. Mathematically, the auction component 226 allows bidding agents to reach optimal utility through dynamically considering at least existing strategies of other bidding agents and future responses of the other bidding agents. Further, the auction component 226 can allow a plurality of bidding agents to place their bids simultaneously, while still enabling a bidding agent to reach optimal utility by taking into account the bidding agent's current behavior and the bidding agent's effect on the future behavior of other bidding agents.

In an embodiment disclosed by FIG. 2, bidding component 224 can perform a response function that can enable the bidding agents of location auction to place bids on, at least in part, the following forward-looking Nash Equilibrium response function:

$$F^{i,G_j}(b^{-i,G_j}) = \begin{cases} v^{i,G_j} - \dfrac{\theta_k^{G_j}}{\theta_{k-1}^{G_j}}\left(v^{i,G_j} - b_{k+1}^{G_j}\right) & 2 \leq k \leq K \\ v^{i,G_j} & k = 1 \text{ or } k > K \end{cases},$$

wherein $b^{-i}=(b^1, \ldots, b^{i-1}, b^{i+1}, \ldots, b^N)$ denotes the bids of all bidders other than bidder i;

$G_j$ represents the $j^{th}$ auction;

$v^{i,G_j}$ is privately known information of bidder i of the $j^{th}$ auction that represents the expected return per-click to bidder i;

k is an advertisement slot of a set of advertisement slots {1, 2, ..., K};

$\theta_k$ is the click rate of advertisement slot k in a descending click rate queue, the advertisement slot k won by bidder i;

$c_{k-1}$ is the click rate of an advertisement slot in the descending click rate queue, $c_{k-1}$ larger than $c_k$; and $b_{k+1}$ is the next highest bid in a descending bid queue. All the auctions are set to have the same numbers of advertising slots for generality. However, if one of the auctions has less than K slots, some dummy slot(s) with click-through-rate equal to 0 can be employed.

For any server knowing its expected return of a local auction, the server can place bid at external auction. The bid to be placed at external auction can be calculated based on the forward looking Nash equilibrium response function shown above. It has proved that the cross-market sponsored keyword auction will eventually converge to forward looking Nash Equilibrium, the server can bid at its own expected return and then lowering its bid to $F^{i,G_j}(b^{-i,G_j})$ to gain profit.

Figure 6:
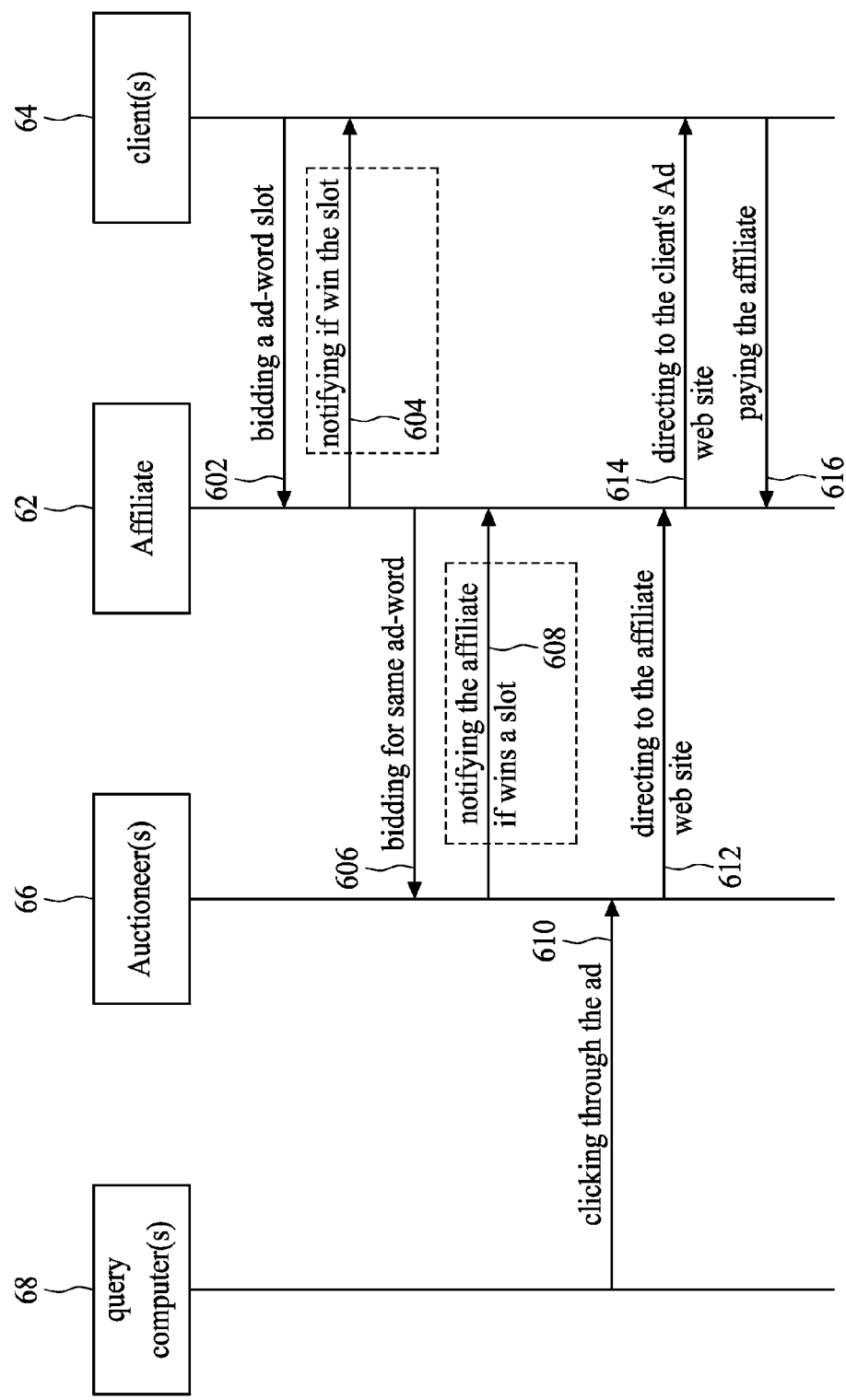
FIG. 6 shows a cross-market sponsored keyword auction model in accordance with the present invention.
Figure 7:
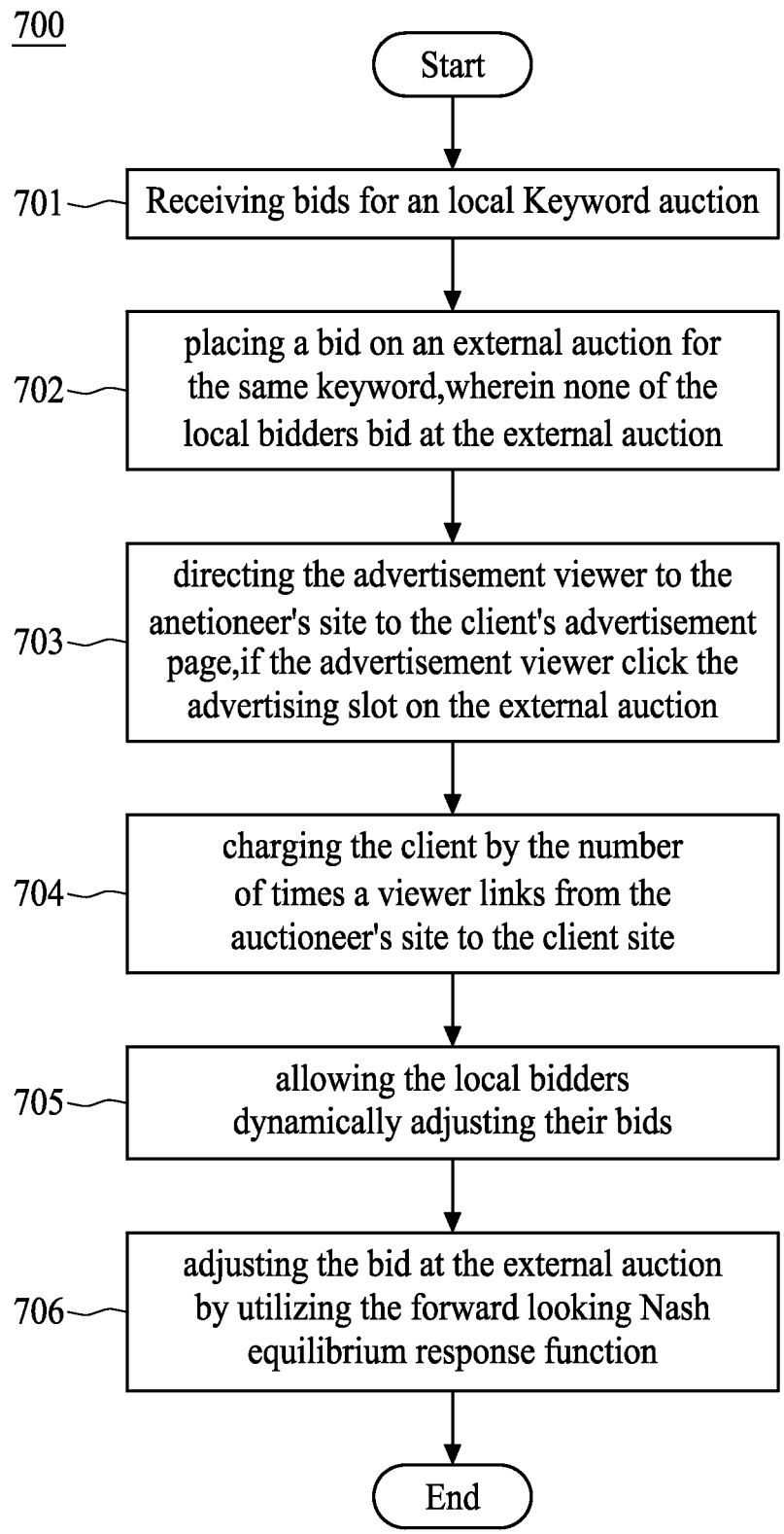
FIG. 7 shows a flow chart operated by an affiliate in the cross market auction model in accordance with some embodiments of the invention.

Another profitable auction scheme through holding sponsored keyword auction and placing bids at other markets is introduced in FIGS. 6-7.

FIG. 6 shows a cross market sponsored keyword auction model 60 in accordance with the present invention. An affiliate 62 comprises a search engine component, auction component for holding sponsored keyword auctions and selling advertising slots, and bidding component for placing bids at external auctions. Client(s) 64 bid for ad-word slot of the local auction hold by the affiliate 62, as shown in event 602. The affiliate 62 may notify its client that he has won one of the advertising slots, as shown in event 604. The affiliate 62 places bids at external auction hold by another auctioneer(s) 66. Suppose the affiliate 62 wins the slot, the auctioneer 66 displays the client(s)' advertisement when a query computer 68 sends a query that is same as the ad-word the client bid. If one user of the query computer(s) 68 clicks through the advertisement slot, the user will be direct to the affiliate's web site then immediately direct to the client's advertisement web site. The affiliate 62 is paid by the number of times that event 612 and 614 has occur. If the affiliate 62 pays less to the other auctioneer(s) 66 than it collects from its own client 64, this strategic behavior would gain new revenue for the affiliate 62. The affiliate 62 will not place bid at any auction that also attend by affiliate's client 64.

FIG. 7 shows a flow chart 700 operated by an affiliate in the cross market auction model in accordance with some embodiments of the invention. In step 701, the affiliate receives bids for a local keyword auction, wherein each bid is for the right to display one advertisement associated with the bid in response to the bid being allocated at least one keyword. In step 702, the affiliate places a bid at an external auction for the same keyword, wherein none of the local bidders bids at the external auction, and the bid is set according to a forward looking Nash equilibrium response function. A user is directed to the affiliate's web site then to the client's advertising web page, if the user clicks through the advertising slot on the external auction. In step 704, client is charged by the number of times a viewer links from the auctioneer's site to the client's site. If any local bidders adjust their bids, as shown in step 705, the affiliate adjusts the bid at the external auction by utilizing the forward looking Nash equilibrium response function, as shown in step 706.

The subject invention provides systems and methods that increase auctioneer's profit by employing a forward-looking Nash Equilibrium in cross-market sponsored keyword auction. The present invention brings the benefits of expressive markets (improved efficiency, simplified bidding experience, improved seller revenue) to dynamic environments of cross-market auctions, in which there is both uncertain supply and uncertain demand and the clearing rules of the markets are designed to provide optimizing behavior, such as maximizing the expected revenue of a seller.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art should recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method, comprising:

receiving, at a server device executing or facilitating execution of a local keyword auction at least one bid for a keyword being auctioned at the local keyword auction, wherein a bid is for a right to display an advertisement associated with the bid in response to the bid being allocated the keyword;

placing, via the server device, another bid at an external auction for the keyword based upon a forward looking Nash equilibrium response function that is based upon the at least one bid;

in response to receiving, at the server device, adjustment data adjusting the at least one bid for the keyword at the local keyword auction; and adjusting, via the server device, the other bid at the external auction based upon the forward looking Nash equilibrium response function and the adjusted at least one bid for the keyword at the local keyword auction.

2. The method of claim 1, further comprising billing a bidder of the bid of the local keyword auction that is allocated the keyword based upon a number of times one or more viewer selects an advertisement associated with the bid and is linked to a web site associated with the advertisement.

3. The method of claim 1, wherein the receiving the at least one bid further comprises receiving a plurality of bids substantially simultaneously.

4. The method of claim 1, further comprising enabling, via the server device, a bidder of the at least one bid to place future bids different from the at least one bid.

5. The method of claim 1,
wherein the forward-looking Nash equilibrium response function comprises:

$$F^{i,G_j}(b^{-i,G_j}) = \begin{cases} v^{i,G_j} - \dfrac{\theta_k^{G_j}}{\theta_{k-1k-1}^{G_j}}\left(v^{i,G_j} - b_{k+1}^{G_j}\right) & 2 \leq k \leq K \\ v^{i,G_j} & k = 1 \text{ or } k > K \end{cases},$$

wherein $b^{-i}=(b^1, \ldots, b^{i-1}, b^{i+1}, \ldots, b^N)$ denotes the bids of all bidders other than bidder i;

$G_j$ represents the $j^{th}$ auction;

$v^{i,G_j}$ is privately known information of bidder i of the $j^{th}$ auction that represents the expected return per-click to bidder i;

k is an advertisement slot of a set of advertisement slots $\{1, 2, \ldots, K\}$;

$\theta_k$ is the click rate of advertisement slot k in a descending click rate queue, the advertisement slot k won by bidder i;

$c_{k-1}$ is the click rate of an advertisement slot in the descending click rate queue, $c_{k-1}$ larger than $c_k$; and $b_{k+1}$ is the next highest bid in a descending bid queue.

6. A system, comprising:

a processor;

a memory communicatively coupled to processor, the memory having stored therein computer-executable components, comprising:

an auction component configured to:

run a local keyword auction for a keyword; and receive at least one bid for the keyword at the local keyword auction, wherein a bid is for a right to display an advertisement associated with the bid in response to the bid being allocated the keyword; and a bidding component configured to place another bid at an external auction for the keyword based upon a forward looking Nash equilibrium response function that is based upon the at least one bid, wherein the auction component is further configured to receive adjustment data that adjusts the at least one bid for the keyword at the local keyword auction, and wherein the bidding component is further configured to adjust the other bid at the external auction based upon the forward looking Nash equilibrium response function and the adjusted at least one bid for the keyword at the local keyword auction.

7. The system of claim 6, wherein the auction component is further configured to bill a bidder of the bid of the local keyword auction that is allocated the keyword based upon a number of selections, received from one or more viewer devices, of the advertisement associated with the bid and is linked to a web site associated with the advertisement.

8. The system of claim 6, wherein the auction component is further configured to receive a plurality of bids substantially concurrently.

9. The system of claim 6, wherein the forward-looking Nash equilibrium response function comprises:

$$F^{i,G_j}(b^{-i,G_j}) = \begin{cases} v^{i,G_j} - \dfrac{\theta_k^{G_j}}{\theta_{k-1}^{G_j}}\left(v^{i,G_j} - b_{k+1}^{G_j}\right) & 2 \leq k \leq K \\ v^{i,G_j} & k = 1 \text{ or } k > K \end{cases},$$

wherein $b^{-i}=(b^1, \ldots, b^{i-1}, b^{i+1}, \ldots, b^N)$ denotes the bids of all bidders other than bidder i;

$G_j$ represents the $j^{th}$ auction;

$v^{i,G_j}$ is privately known information of bidder i of the $j^{th}$ auction that represents the expected return per-click to bidder i;

k is an advertisement slot of a set of advertisement slots $\{1, 2, \ldots, K\}$;

$\theta_k$ is the click rate of advertisement slot k in a descending click rate queue, the advertisement slot k won by bidder i;

$c_{k-1}$ is the click rate of an advertisement slot in the descending click rate queue, $c_{k-1}$ larger than $c_k$; and $b_{k+1}$ is the next highest bid in a descending bid queue.

10. A non-transitory computer-readable medium having instructions stored thereon that, in response to execution, cause at least one device to perform operations comprising:

running a local keyword auction for a keyword;

receiving at least one bid for the keyword being auctioned at the local keyword auction, wherein a bid is for a right to display an advertisement associated with the bid in response to the bid being allocated the keyword;

placing another bid at an external auction for the keyword based upon a forward looking Nash equilibrium response function that is based upon the at least one bid;

receiving an indication of an adjustment to the at least one bid for the keyword at the local keyword auction resulting in an adjusted at least one bid; and adjusting the bid at the external auction based upon the forward looking Nash equilibrium response function and the adjusted at least one bid for the keyword at the local keyword auction.

11. The non-transitory computer-readable medium of claim 10, the operations further comprising billing a bidder of the bid of the local keyword auction that is allocated the keyword based upon a number of times an advertisement associated with the bid is selected by one or more viewer devices and is linked to a web site associated with the advertisement.

12. The non-transitory computer-readable medium of claim 10, wherein receiving the at least one bid further comprising receiving a plurality of bids substantially simultaneously.

13. The non-transitory computer-readable medium of claim 10, wherein the forward-looking Nash equilibrium response function comprises:

$$F^{i,G_j}(b^{-i,G_j}) = \begin{cases} v^{i,G_j} - \dfrac{\theta_k^{G_j}}{\theta_{k-1k-1}^{G_j}}\left(v^{i,G_j} - b_{k+1}^{G_j}\right) & 2 \leq k \leq K \\ v^{i,G_j} & k = 1 \text{ or } k > K \end{cases},$$

wherein $b^{-i}=(b^1, \ldots, b^{i-1}, b^{i+1}, \ldots, b^N)$ denotes the bids of all bidders other than bidder i;

$G_j$ represents the $j^{th}$ auction;

$v^{i,G_j}$ is privately known information of bidder i of the $j^{th}$ auction that represents the expected return per-click to bidder i;

k is an advertisement slot of a set of advertisement slots {1, 2, ..., K};

$\theta_k$ is the click rate of advertisement slot k in a descending click rate queue, the advertisement slot k won by bidder i;

$c_{k-1}$ is the click rate of an advertisement slot in the descending click rate queue, $c_{k-1}$ larger than $c_k$; and $b_{k+1}$ is the next highest bid in a descending bid queue.

14. A system comprising:

means for executing a local keyword auction for a keyword;

means for receiving at least one bid for the keyword being auctioned at the local keyword auction, wherein a bid is for a right to display an advertisement associated with the bid in response to the bid being allocated the keyword;

means for placing another bid at an external auction for the keyword based upon a forward looking Nash equilibrium response function that is based upon the at least one bid;

means for receiving a dynamic adjustment to the at least one bid for the keyword at the local keyword auction; and means for adjusting the other bid at the external auction based upon the forward looking Nash equilibrium response function and the adjusted at least one bid for the keyword at the local keyword auction.

15. The system of claim 14, further comprising means for billing a bidder of the bid of the local keyword auction that is allocated the keyword based upon a number of times an advertisement associated with the bid is selected and is linked to a web site associated with the advertisement.

16. The system of claim 14, wherein the forward-looking Nash equilibrium response function comprises:

$$F^{i,G_j}(b^{-i,G_j}) = \begin{cases} v^{i,G_j} - \dfrac{\theta_k^{G_j}}{\theta_{k-1k-1}^{G_j}}\left(v^{i,G_j} - b_{k+1}^{G_j}\right) & 2 \le k \le K \\ v^{i,G_j} & k = 1 \text{ or } k > K \end{cases},$$

wherein $b^{-i}=(b_1, \ldots, b^{i-1}, b^{i+1}, \ldots, b^N)$ denotes the bids of all bidders other than bidder i;

$G_j$ represents the $j^{th}$ auction;

$v^{i,G_j}$ is privately known information of bidder i of the $j^{th}$ auction that represents the expected return per-click to bidder i;

k is an advertisement slot of a set of advertisement slots {1, 2, ..., K};

$\theta_k$ is the click rate of advertisement slot k in a descending click rate queue, the advertisement slot k won by bidder i;

$c_{k-1}$ is the click rate of an advertisement slot in the descending click rate queue, $c_{k-1}$ larger than $c_k$; and $b_{k+1}$ is the next highest bid in a descending bid queue.

* * * * *